United States Patent
Gwidt et al.

(10) Patent No.: US 11,661,902 B1
(45) Date of Patent: May 30, 2023

(54) PORT-DIRECT INJECTION ENGINE SYSTEMS AND METHODS USING ETHANOL-GASOLINE FUELS

(71) Applicant: GM GLOBAL TECHNOLOGY OPERATIONS LLC, Detroit, MI (US)

(72) Inventors: J. Michael Gwidt, Brighton, MI (US); Jeffrey M Hutmacher, Fowlerville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/660,712

(22) Filed: Apr. 26, 2022

(51) Int. Cl.
| | |
|---|---|
| *F02D 19/08* | (2006.01) |
| *F02D 41/36* | (2006.01) |
| *F02D 41/40* | (2006.01) |
| *F02D 41/38* | (2006.01) |

(52) U.S. Cl.
CPC .......... *F02D 41/36* (2013.01); *F02D 19/081* (2013.01); *F02D 19/084* (2013.01); *F02D 19/085* (2013.01); *F02D 19/087* (2013.01); *F02D 19/088* (2013.01); *F02D 41/40* (2013.01); *F02D 2041/389* (2013.01); *F02D 2200/0611* (2013.01)

(58) Field of Classification Search
CPC .... F02D 19/081; F02D 19/084; F02D 19/085; F02D 19/087; F02D 19/088; F02D 2200/0611
USPC ................................................. 123/1 A, 431
See application file for complete search history.

(56) References Cited

U.S. PATENT DOCUMENTS

| | | | |
|---|---|---|---|
| 7,546,835 B1 * | 6/2009 | Hilditch | F02D 19/081 123/577 |
| 7,621,257 B1 * | 11/2009 | Leone | F02D 19/0692 123/90.15 |
| 7,676,321 B2 * | 3/2010 | Andri | B60K 6/547 123/304 |
| 7,845,334 B2 * | 12/2010 | Lippa | F02D 19/084 123/431 |
| 8,069,839 B2 | 12/2011 | Cohn et al. | |
| 8,150,599 B2 * | 4/2012 | Nishimura | F02D 19/0689 701/104 |
| 8,498,799 B2 | 7/2013 | Matthews, Jr. et al. | |
| 8,706,383 B2 | 4/2014 | Sauve et al. | |
| 9,169,789 B2 | 10/2015 | Cowgill et al. | |
| 2009/0308367 A1 * | 12/2009 | Glugla | F02D 19/061 123/299 |
| 2015/0122218 A1 * | 5/2015 | Wakao | F02D 19/061 123/304 |

FOREIGN PATENT DOCUMENTS

| | | | | |
|---|---|---|---|---|
| WO | WO-2008111689 A1 * | 9/2008 | .......... | F02D 19/061 |
| WO | WO-2012168793 A1 * | 12/2012 | .......... | F02D 19/061 |

* cited by examiner

*Primary Examiner* — Erick R Solis
(74) *Attorney, Agent, or Firm* — Lorenz & Kopf LLP

(57) ABSTRACT

Methods and systems for flex fuel engines that have both port fuel injection and direct injection. Operating an engine system includes determining a percent of ethanol in a fuel and determining whether the percent of ethanol is greater than a predetermined threshold. When the percent of ethanol is greater than the predetermined threshold, fuel is supplied only through the direct injection injectors. When the percent of ethanol is not greater than the predetermined threshold, fuel is supplied through a combination of the direct injection injectors and port fuel injection injectors.

20 Claims, 3 Drawing Sheets

PORT-DIRECT INJECTION ENGINE SYSTEMS AND METHODS USING ETHANOL-GASOLINE FUELS

INTRODUCTION

The technical field generally relates to internal combustion engines operating on gasoline-ethanol fuels, and more particularly relates to methods and systems for apportioning fuel between port fuel injection injectors and direct injection injectors of an internal combustion engine.

Internal combustion engines may include fuel injectors that inject fuel at specific locations for mixing with intake air stream to produce an air/fuel mixture. Various types of fuel injection system may be used including port fuel injection (PFI) systems and direct injection (DI) systems. In a PFI system, fuel is injected into the intake manifold, such as in a runner, for introduction to the intake airstream before reaching the engine's intake valves and cylinders. When travelling past an open intake valve, the fuel is already mixing with the air as the intake stream enters the engine's cylinders. In a DI system, the injectors are placed to inject fuel directly into the engine's cylinders for mixing with the intake air after the air has passed an open intake valve and entered a cylinder. With PFI, fuel may be injected under a significantly lower pressure than with DI since it is introduced into the air as it is being drawn into the engine's cylinders, rather than directly into a cylinder i.

In some applications, an engine may be equipped with both a PFI system and a DI system in a dual port-direct injection (PDI) system to take advantage of both types of injection systems. Controlling both systems simultaneously may be complex. When variations in fuel compositions are added to the variables, the level of control complexity increases. For example, gasoline fuels often contain no ethanol, a relatively low percentage of ethanol such as ten or fifteen-percent, or a relatively high percentage of ethanol such as eighty-five-percent. These different formulations add challenges in controlling an engine.

Accordingly, it is desirable to provide methods and systems for controlling fuel injection systems, including those with both PFI and DI systems, when various gasoline formulations may be used at different times during operation of an engine. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for flex fuel engines that have both port fuel injection and direct injection. In a number of embodiments, a method of operating an engine system includes determining a percent of ethanol in a fuel and determining whether the percent of ethanol is greater than a predetermined threshold. When the percent of ethanol is greater than the predetermined threshold, fuel is supplied only through the direct injection injectors. When the percent of ethanol is not greater than the predetermined threshold, fuel is supplied through a combination of the direct injection injectors and port fuel injection injectors.

In additional embodiments, the controller, when the percent of ethanol is not greater than the predetermined threshold, operates the engine system supplying the fuel through a combination of the direct injection injectors and the port fuel injection injectors.

In additional embodiments, the controller, based on the percent of ethanol, determines a ratio of the fuel supplied through the port fuel injectors to the fuel supplied through the direct injection injectors.

In additional embodiments, the predetermined threshold is set at a level of ethanol in the fuel where particulate emissions from the engine system are less than when the engine system is operated on gasoline without ethanol.

In additional embodiments, an engine defines a number of cylinders. An intake system supplies air to the number of cylinders. The direct injection injectors inject a first fraction of the fuel directly into the number of cylinders, and the port fuel injection injectors inject a second fraction of the fuel into the intake system outside the number of cylinders.

In additional embodiments, an ethanol sensor collects sensed fuel data, which is received by the controller, the sensed fuel data. The controller determines, using the sensed fuel data, the percent of ethanol in the fuel.

In additional embodiments, the controller, controls particulate matter discharge from the engine system by apportioning a first fraction of the fuel to the port fuel injection injectors and apportioning a second fraction of the fuel to the direct injection injectors, where the first fraction and the second fraction total all of the fuel supplied into an engine of the engine system.

In additional embodiments, the controller, when the percent of ethanol is not greater than the predetermined threshold, sets a supply of the fuel through the port fuel injection injectors to a maximum of seventy-percent of a total flow of fuel for combustion in the engine system.

In additional embodiments, the controller, when the percent of ethanol is greater than the predetermined threshold, maintains the port fuel injection injectors in a closed state.

In additional embodiments, the controller, when the percent of ethanol is not greater than the predetermined threshold, supplies the fuel through a combination of the direct injection injectors and the port fuel injection injectors as a function of the percent of ethanol and independent of a load on the engine system.

In a number of additional embodiments, an engine system includes port fuel injection injectors, direct injection injectors, and a controller configured to: determine a percent of ethanol in a fuel of the engine system; determine whether the percent of ethanol is greater than a predetermined threshold; and operate, when the percent of ethanol is greater than the predetermined threshold, the engine system supplying the fuel only through the direct injection injectors.

In additional embodiments, the controller operates, when the percent of ethanol is not greater than the predetermined threshold, the engine system supplying the fuel through a combination of the direct injection injectors and the port fuel injection injectors.

In additional embodiments, the controller determines, based on the percent of ethanol, a ratio of the fuel supplied through the port fuel injectors to the fuel supplied through the direct injection injectors.

In additional embodiments, the predetermined threshold is set at a level of ethanol in the fuel where particulate emissions from the engine system are less than when the engine system is operated on gasoline without ethanol.

In additional embodiments, an engine defines a number of cylinders. An intake system supplies air to the cylinders. The controller is configured to inject, through the direct injection injectors, a first fraction of the fuel directly into the number of cylinders, and to inject, through the port fuel injection injectors, a second fraction of the fuel into the intake system outside the number of cylinders.

In additional embodiments, an ethanol sensor collects sensed fuel data, which is received by the controller. The controller determines, using the sensed fuel data, the percent of ethanol in the fuel.

In additional embodiments, the controller, controls particulate matter discharge from the engine by apportioning a first fraction of the fuel to the port fuel injection injectors and apportioning a second fraction of the fuel to the direct injection injectors, wherein the first fraction and the second fraction total all of the fuel supplied into the engine.

In additional embodiments, the controller sets, when the percent of ethanol is not greater than the predetermined threshold, a supply of the fuel through the port fuel injection injectors to a maximum of seventy-percent of a total flow of fuel for combustion in the engine system.

In additional embodiments, the controller maintains, when the percent of ethanol is greater than the predetermined threshold, the port fuel injection injectors in a closed state. When the percent of ethanol is not greater than the predetermined threshold, the fuel is delivered through a combination of the direct injection injectors and the port fuel injection injectors as a function of the percent of ethanol, and independent of a load on the engine system.

In a number of other embodiments, an engine system includes an engine defining a number of cylinders and configured to operate on a fuel. An intake system is configured to supply air to the cylinders. A set of direct injection injectors is configured to inject the fuel directly into the number of cylinders. A set of port fuel injection injectors is configured to inject the fuel into the intake system outside the number of cylinders. A controller is configured to: determine a percent of ethanol in a fuel of the engine system; determine whether the percent of ethanol is greater than a predetermined threshold; operate, when the percent of ethanol is greater than the predetermined threshold, the engine system supplying the fuel only through the direct injection injectors; and operate, when the percent of ethanol is not greater than the predetermined threshold, the engine system supplying the fuel through a combination of the direct injection injectors and the port fuel injection injectors.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
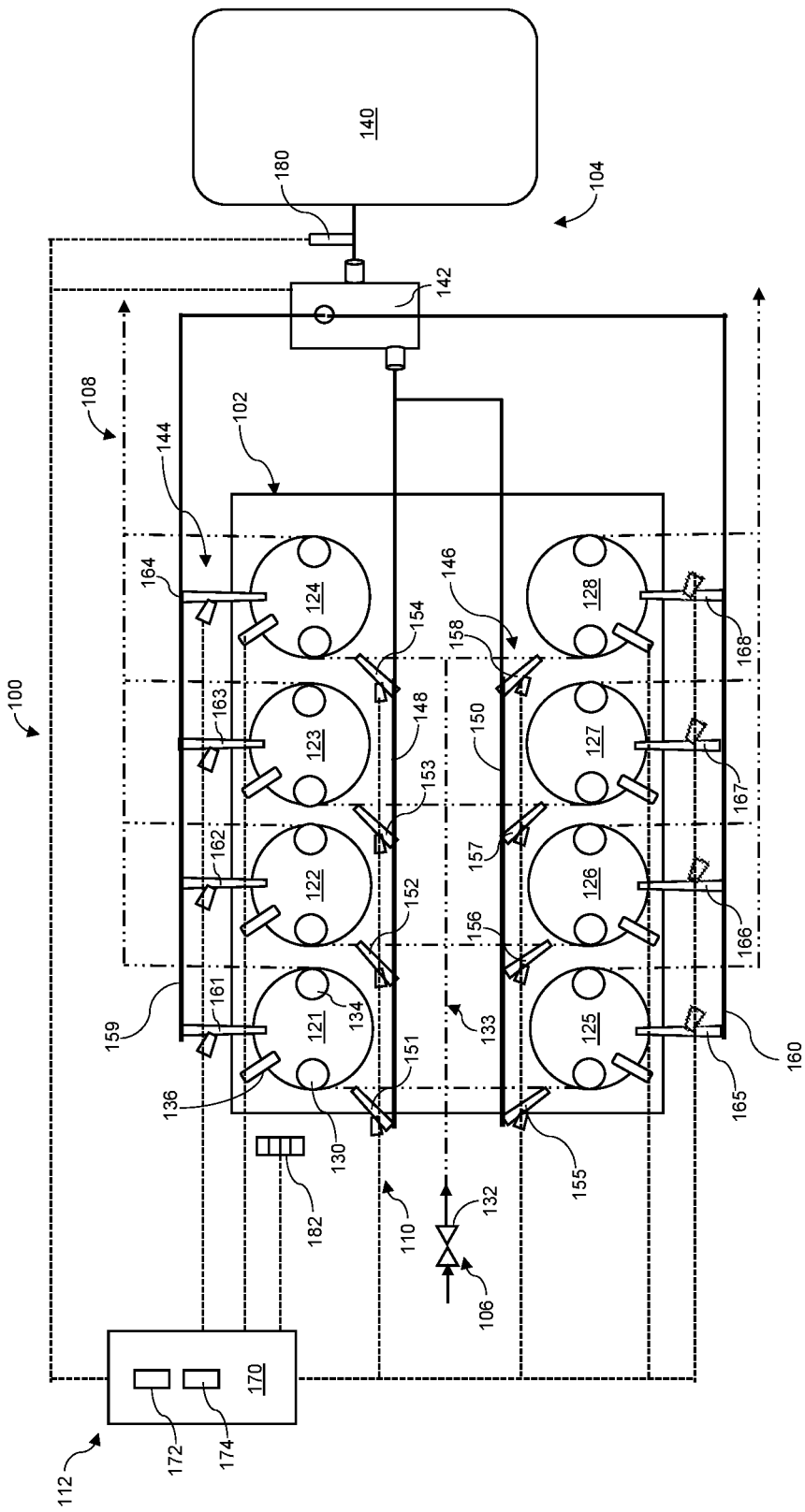
FIG. 1 is a functional diagram illustrating an engine system having a port-direct fuel injector system with both port fuel injection and direct injection, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In various embodiments, an engine system employs both PFI and DI systems in a dual arrangement for each of the engine's cylinders. The engine system is configured as a flex-fuel system to operate on more than one fuel such as gasoline and various gasoline-ethanol blends. The PFI+DI (PDI) engine system generally supplies a majority of the fuel through the PFI injectors when running pure gasoline fuels, with the goal of reducing particulate emission, as PFI injections produce less particulate than DI injections. The PFI injection fraction of the total fuel supplied to the engine's cylinders is reduced and the DI injection fraction of the total fuel supplied is increased as the ethanol content of the fuel increases. Particulate production is maintained substantially level without increasing significantly as more fuel is supplied through the DI injectors. Supplying the highest possible percentage of fuel though the DI injectors, while limiting particulate matter, advantageously enables maintaining optimal ignition timing and maximum efficiency of operation, while simplifying control when using ethanol blends.

With reference to FIG. 1, an engine system is shown generally at 100. In various embodiments, the engine system 100 may be associated with a vehicle (not shown), however, the current disclosure is not limited to vehicle applications. In general, the engine system 100 includes the engine 102, a fuel system 104, an intake system 106, an exhaust system 108, an ignition system 110, and a control system 112.

The engine 102 includes a number of cylinders 121-128. In the current embodiment, the engine 102 includes the eight cylinders 121-128. In other embodiments any number of individual cylinders may be employed. Each of the cylinders 121-128, for example cylinder 121, is associated with one or more intake valve(s), such as intake valve 130, through which air from the intake system 106 is selectively admitted to the respective cylinder 121. The intake system 106 includes a valve, such as a throttle body valve 132, the position of which determines the amount of air delivered to the engine 102, such as based on driver inputs. The incoming air is routed through an intake manifold 133. Each cylinder 121-128, for example cylinder 121, is associated with one or more exhaust valve(s), such as exhaust valve 134, through which gases from the cylinders 121-128 are selectively delivered to the exhaust system 108 for discharge. The exhaust system 108 may include a number of additional components (not shown), for monitoring and managing the exhaust gases.

The ignition system 110 includes a spark plug in each of the cylinders 121-128. For example, a spark plug 136 is included in the cylinder 121. As such, the engine 102 is a spark ignition engine. In other embodiments, another form of combustion initiation, such as compression ignition may be employed. The ignition system 110 may include a number of additional components (not shown), such as an ignition switch, a battery, an ignition module, a coil or coils, and various sensors.

The fuel system 104 includes a fuel source, such as a fuel tank 140, one or more pump(s) 142, a PFI system 144, and a DI system 146. The PFI system 144 includes fuel rails 148 and 150, which may be interconnected with each other and that are coupled with the pump(s) 142. In addition, the PFI system 144 includes PFI injectors 151-158, each one of which is associated with a respective cylinder 121-128. Each of the PFI injectors 151-158 is disposed in the air intake system 106, in the intake manifold 133 to inject fuel upstream of the cylinders 121-128, such as in a runner or mixing chamber. The DI system 146 includes fuel rails 159 and 160, which may be interconnected with each other and that are coupled with the pump(s) 142. In addition, the DI system 146 includes DI injectors 161-168, each one of which is associated with a respective cylinder 121-128. Each of the DI injectors 161-168 is disposed in a cylinder 121-128 respectively, to inject fuel directly into the respective cylinder 121-128.

The pump(s) 142 are configured to supply fuel at different pressures. The pump(s) 142 supply a relatively low pressure fuel flow to the PFI fuel rails 148, 150, and supply a relatively high pressure fuel flow to the DI fuel rails 159, 160. Relatively low pressure means the pressure supplied to the PFI fuel rails 148, 150 is lower than the fuel pressure supplied to the DI fuel rails 159, 160 and is sufficient to support fuel injection into the intake manifold 133 by the PFI injectors 151-158. The relatively high fuel pressure supplied to the DI injectors is higher relative to the PFI pressure and is sufficient to support fuel injection directly into the cylinders 121-128 by the DI fuel injectors 161-168. The fuel system 104 may include a number of additional components (not shown) such as regulators, valves, and various sensors. The pump(s) 142 may be configured as one unit as shown, or may be constructed as two or more units. For example, the PFI fuel rails 148, 150 may be supplied directly by a pump in the fuel tank 140, or may be supplied by such as pump and routed as a pass through via the pump(s) 142, with the pump(s) 142 separately supplying higher pressure for the DI fuel rails 159, 160.

The control system 112 includes at least one controller 170, various sensors and various actuators. The controller 170 may receive information in signals from the various sensors, process that information, and send control signals/commands to the various actuators for operation of the engine system 100. The controller includes at least one processor 172 and a computer readable storage device or media 174. The processor 172 may be any custom made or commercially available processor, a central processing unit (CPU), a graphics processing unit (GPU), an auxiliary processor among several processors associated with the controller 170, a semiconductor based microprocessor (in the form of a microchip or chip set), a macroprocessor, any combination thereof, or generally any device for executing instructions. The computer readable storage device or media 174 may include volatile and nonvolatile storage in read-only memory (ROM), random-access memory (RAM), and keep-alive memory (KAM), for example. KAM is a persistent or non-volatile memory that may be used to store various operating variables while the processor 172 is powered down. The computer-readable storage device or media 174 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 170 in controlling the engine system 100.

The instructions may include one or more separate programs, each of which comprises an ordered listing of executable instructions for implementing logical functions. The instructions, when executed by the processor 172, receive and process signals from the sensors 180, 182, perform logic, calculations, methods and/or algorithms for controlling the components of the engine system 100 through the various actuators. Although only one controller 170 is shown in FIG. 1, embodiments of the engine system 100 may include any number of controllers 170 that communicate over any suitable communication medium or a combination of communication mediums and that cooperate to process the sensor signals, perform logic, calculations, methods, and/or algorithms, and generate control signals to automatically control aspects of the engine system 100 and/or related systems. In various embodiments, one or more instructions of the controller 170 are embodied in the control system 170 and, when executed by the processor 172, monitor sensed values associated with the engine 102 to determine operation of the engine 102 and the fuel system 104.

The various sensors sense observable conditions of the engine system 100. In various embodiments, the sensed values include fuel ethanol content data associated with the fuel in the fuel system 104. In that regard, the various sensors include a flex fuel (ethanol) sensor 180. The flex fuel sensor 180 may operate by detecting the capacitance of the fuel, which changes based on the ethanol content. In some embodiments, the flex fuel sensor may include its own microprocessor to supply a signal, such as a frequency signal to the controller 170. The signal carries the ethanol percentage via the frequency of the signal, and the controller 170 equates the frequency to ethanol percentage, such as via reference to stored data such as in a look-up table, or via a calculation.

The various sensors also include those provided as part of the throttle body valve 132, the PFI injectors 151-158, the DI injectors 161-168, the ignition system 110, the pump(s) 142, and also include the engine sensor suite 182. The sensors referenced collectively as the engine sensor suite 182 may include those that monitor mass airflow, intake manifold absolute pressure, intake air temperature, engine coolant temperature, engine speed, exhaust gas temperature, and/or exhaust gas oxygen concentration, accelerator pedal position, and other conditions useful for operation of the engine system 100.

The various actuators include the PFI injectors 151-158, the DI injectors 161-168, the throttle body valve 132, the pump(s) 142, and the spark plugs (e.g. 136). It will be appreciated that operation of the engines system 100 may entail use of a number of other actuators responsive to the control system 170 that are not illustrated or described for purposes of the current disclosure.

Figure 2:
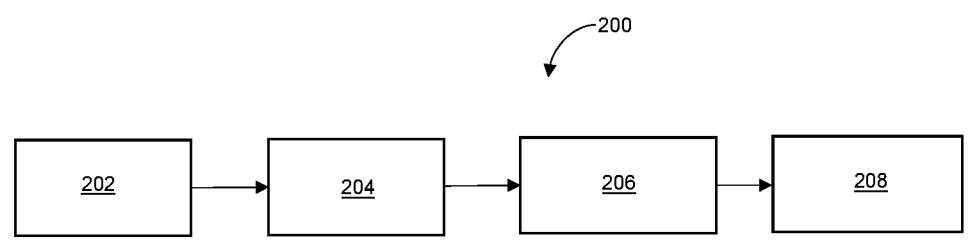
FIG. 2 is a control diagram for the engine system of FIG. 1, in accordance with various embodiments.

Referring to FIG. 2 along with FIG. 1, a control system 200 is illustrated for operation of the engine 102. Inputs 202 are obtained from the various sensors, such as the flex fuel sensor 180, and the engine sensor suite 182. Position of the throttle body valve 132 may be set based on driver input, such as via an accelerator pedal, which setting determines air flow to the cylinders 121-128. Based on the air flow and the sensed values, the amount of fuel supplied to the engine 102 (total fuel mass) is determined 204 by the controller 170. The throttle body valve 132 may include a throttle body position sensor and air flow sensor in communication with the controller 170 for determinations of selecting a corresponding amount of fuel for supply to the engine 102. The fuel mass determination 204 defines the fuel mass to be injected into the engine 102. For example, the fuel mass determination may determine a total fuel mass to be apportioned between the PFI injectors 151-158 and the DI injectors 161-168. The fuel mass determination module 70 may determine the fuel mass so that the amount of fuel injected and apportioned maintains a target air/fuel ratio for stoichiometric operation of the engine 102 given its current operating state. Stoichiometric operation results in complete burning of the fuel and air delivered to the cylinders 121-128. The controller 170 commands an amount of fuel to be delivered to each cylinder 121-128 by its respective injector(s) 151-158 and/or 161-168, apportioned between the two types of injectors according to a PDI ratio determination.

The PFI and DI fractions are determined 206 to define a percentage of the total fuel mass to be injected by the PFI injectors 151-158 and a percentage of the total fuel mass to be injected by the DI injectors 161-168, as a function of ethanol content in the fuel, as further described below. Based on the PFI and DI fractions, and the injector characteristics, operation of the PFI injectors 151-158 and/or the DI injectors 161-168 is set. Injector characteristics may include the amount of fuel injected per time period, which may be obtained by characteristic testing and/or modelling. A pulse width for each injector may be determined based on the fuel mass fractions and number of cylinders, and the controller 170 may generate pulse-width modulated (PWM) control signals having the desired pulse width for operating the PFI injectors 151-158 and/or the DI injectors 161-168.

In various embodiments, the engine 102 may operate using a four-stroke cycle including an intake stroke, a compression stroke, a combustion stroke, and an exhaust stroke. During their respective intake strokes, air from the intake manifold 133 is drawn into the cylinders 121-128 through intake valves (e.g. 130). The PFI injectors 151-158 and the DI injectors 161-168 are actuated 208 via the controller 170, to inject fuel into the air to achieve a target air/fuel ratio. The controller 170 controls particulate matter discharge from the engine system 100 by apportioning, based on ethanol content in the fuel, a first fraction of the fuel to the port fuel injection injectors 151-158 and apportioning a second fraction of the fuel to the direct injection injectors 161-168, where the first fraction and the second fraction total all of the fuel supplied into the engine 102.

The injected fuel mixes with the intake air and creates an air/fuel mixture in each cylinder 121-128. During the respective cylinder's compression stroke, a piston (not shown) compresses the air/fuel mixture. The engine 102 may be a spark-ignition engine, in which case a spark plug is energized to generate a spark (e.g. spark plug 136 in the cylinder 121), which ignites the air/fuel mixture. The timing of the spark may be specified relative to the time when the piston is at its topmost position, referred to as top dead center (TDC). In some embodiments, the engine 102 may be a compression-ignition engine, in which case compression ignites the air/fuel mixture.

During the combustion stroke, combustion of the air/fuel mixture drives the piston down, thereby driving a crankshaft in the engine 102. The combustion stroke may be defined as the time between the piston reaching TDC and the time at which the piston returns to bottom dead center (BDC). During the exhaust stroke, the piston begins moving up from BDC and expels the combustion gases through the exhaust system 108.

Figure 3:
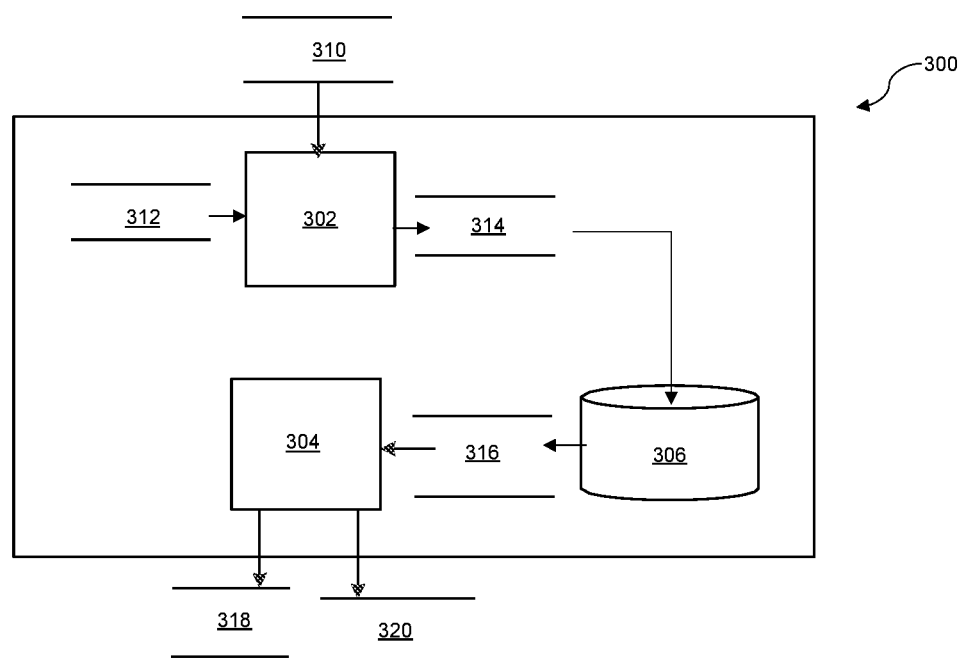
FIG. 3 is a dataflow diagram illustrating a control approach of the fuel injector system of FIG. 1, in accordance with various embodiments.

Referring to FIG. 3, and with continued reference to FIG. 1, a dataflow diagram illustrates various embodiments of a PFI and DI fraction system 300 which may be embedded within the controller 170 and which may include parts of the engine system 100 in accordance with various embodiments. Embodiments of the PFI and DI fraction system 300 according to the present disclosure may include any number of sub-modules embedded within the controller 170. As will be appreciated, the sub-modules shown in FIG. 3 may be combined and/or further partitioned to similarly operate the engine system 100. Inputs to PFI and DI fraction system 300 may be received from the sensor suite 182, the flex fuel sensor 180, received from other controllers (not shown) associated with the engine system 100, and/or determined/modeled by other sub-modules (not shown) within the controller 170. In various embodiments, the PFI and DI fraction system 300 includes a fuel ethanol content determination module 302, a PFI and DI fraction computation module 304, and a model datastore 306.

The fuel ethanol content determination module 302 receives as input sensed fuel data 310, such as from the flex fuel sensor 180, and conversion data 312, such as from the datastore 306. The fuel ethanol content determination module 302 determines ethanol percentage data 310, which is used by the PDI and DI fraction calculation module 304. In various embodiments, the fuel ethanol content determination module 302 correlates the sensed fuel data 310 with the conversion data 312 to determine the percentage of ethanol in the fuel. In other embodiments, the fuel ethanol content determination module 302 may calculate the percentage of ethanol in the fuel such as by using a model stored in the datastore. For example, a model may use a detected refueling event of the fuel tank 140, such as registered by a fuel level sensor, followed by monitoring of oxygen sensors in the exhaust system 108 to determine whether a shift in equivalence ratio (air/fuel ratio) of the operating engine 102 occurred. If so, the shift is correlated to ethanol percentage.

The PDI and DI fraction computation module 304 retrieves ethanol percentage data 314, an ethanol model 316, and a PDI ratio model 318 from the datastore 306, and processes the ethanol percentage data 314, the ethanol model 316 and the PDI ratio model 318 to calculate the PFI fraction data 320 and the DI fraction data 322, as further described below. PDI ratio is the split between PFI injection and DI injection out of the total fuel mass supplied to the engine 102. For example, when the split is seventy-percent PFI and thirty-percent DI, the PDI ratio is 70/30. The PFI and DI fraction data 320, 322 may be used by the engine system 100 to inject the desired fractions of the total fuel mass through the PFI injectors 151-158 and/or the DI injectors 161-168 thereby controlling particulate matter generation.

Figure 4:
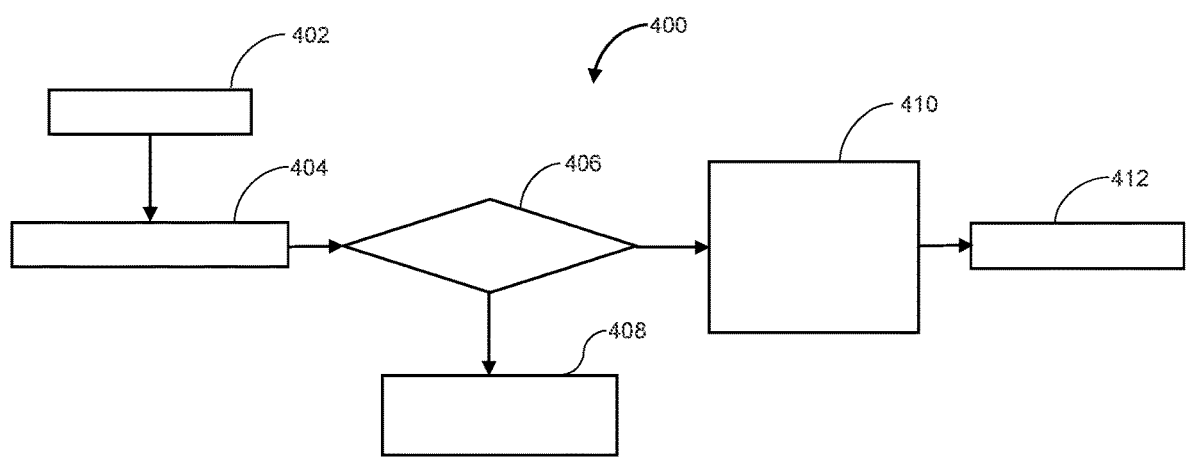
FIG. 4 is a flowchart illustrating methods performed by the fuel injector system of FIG. 1, in accordance with various embodiments.

Referring to FIG. 4 with continued reference to FIGS. 1-3, a flowchart illustrates a method 400 performed by the engine system 100 of FIG. 1 in accordance with the present disclosure. As can be appreciated, in light of the disclosure, the order of operations within the method is not limited to the sequential execution as illustrated in FIG. 4, and may be performed in one or more varying orders as applicable and in accordance with the present disclosure.

In various embodiments, the method 400 may be scheduled to run based on operation of the engine 302. For example, the method 400 may begin at 402 when operation of the engine 302 is initiated via the ignition system 110. The sensed fuel data 310 and the conversion data 312 are used at determine 404 the ethanol percentage in the fuel being supplied through the fuel system 104. For example, the flex fuel sensor 180 provides the controller 170 with a signal indicative of the percentage of ethanol in the fuel. For example, the frequency of the signal may be set based on the fuel's measured capacitance. Typical frequencies may range from 50-150 Hz., for example. The controller 170 may reference the conversion data 312 to convert the frequency received to the ethanol percentage data 314, which is a specific percentage.

A determination 406 is conducted as to whether the ethanol percentage data 314 is greater than an ethanol percentage threshold (Ě). Ě is a percent of ethanol in the fuel where particulate emissions from the engine 102 first fall below a level that the engine 102 would produce if running on one-hundred-percent gasoline (no ethanol) with a set PDI ratio. In other words, E is the threshold ethanol percentage where operating the engine 102 with one-hundred-percent DI injectors 161-168 and zero-percent PFI injectors 161-168 results in as low a level of particulate matter generation as operating the engine 102 on straight gasoline. The PDI ratio is the ratio of fuel injected through the PFI injectors 151-158 to the fuel injected through the DI injectors 161-168. Ě for the PDI ratios from 0-100 may be determined based on characteristic testing and/or modelling of the particular engine 102 and will vary by engine. The Ě values for the engine 102 may be stored, such as in the datastore 306 in table or model form, for retrieval. The PDI and DI fraction computation module 304, using the ethanol model 316 and the ethanol percentage data 314 determines 406 whether the Ě threshold is met. The ethanol model 316 compares ethanol percentage data 314 (ethanol percentage in the fuel) to the stored Ě values. When the ethanol percentage data 314 is greater than Ě, the method 400 sets 408, operation of the engine 102 to zero-percent fuel flow through the PDI injectors 151-158 and one-hundred-percent fuel flow through the DI injectors 161-168. For example, the signals to the PFI injectors 151-158 are set to zero-percent PWM and the controller 170, when the percent of ethanol is greater than the predetermined threshold, maintains the port fuel injection injectors 151-158 in a closed state. This simplifies further control of the engine 102 because only one set of injectors (DI injectors 161-168) are operating, with no undesirable levels of particulate matter resulting.

Ethanol fuels produce significantly lower particulate matter emission than pure gasoline fuels. On the PFI+DI engine 102 the fuel is provided mostly by the PFI injectors when running pure gasoline fuels, with the goal of reducing particulate emissions. This is because PFI injections result in less particulate matter emissions than DI injections. With the PFI+DI engine 102, the PFI injection to DI injection ratio is reduced, delivering more fuel through the DI injectors 161-168 and less fuel through the PFI injectors 151-158, as the ethanol content of the fuel increases, with particulate emissions approximately remaining level. Accordingly, when the determination 406 is negative, and the ethanol percentage data 314 is not greater than (is less than or equal to), the method 400 proceeds to set the PDI ratio as a function of ethanol percent.

The PDI and DI fraction computation module 304, using the PDI ratio model 318, and the ethanol percentage data 314 determines 410 the PFI fraction data 320 and the DI fraction data 322 based on the PDI ratio. The PDI ratio model 318 decreases the ratio of PFI to DI as the ethanol content of the fuel increases. The PDI ratio model 318 may be determined based on characteristic testing and/or modelling of the engine system 100. For example, at zero-percent ethanol (pure gasoline fuel), the PDI ratio may be approximately seventy-percent PFI and thirty-percent DI. Accordingly, the fraction of the fuel supplied through the PFI injectors 151-158 is seventy-percent of the total fuel mass supplied through the fuel system 104, and the fraction of the fuel supplied through the DI injectors 161-168 is thirty-percent of the total fuel mass supplied through the fuel system 104. Also for example, and in the engine 102, when E60 (60% ethanol) fuel and above is used, the PDI ratio may be zero-percent PFI and one-hundred-percent DI. Accordingly, the fraction of the fuel supplied through the PFI injectors 151-158 is zero-percent of the total fuel mass supplied through the fuel system 104, and the fraction of the fuel supplied through the DI injectors 161-168 is one-hundred-percent of the total fuel mass supplied through the fuel system 104.

Figure 5:
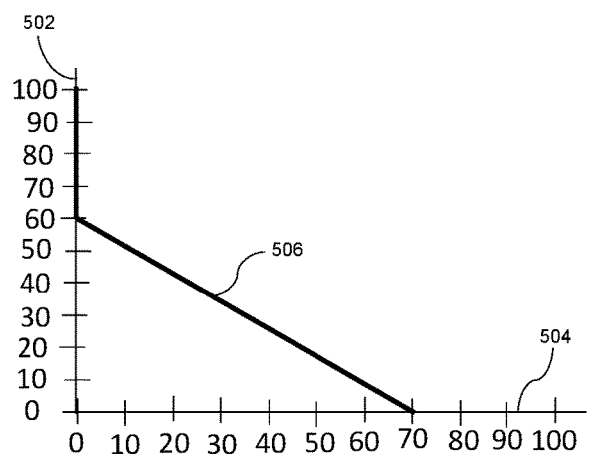
FIG. 5 is a graph of ethanol percent on the vertical axis versus PFI fraction on the horizontal axis, in accordance with various embodiments.

For ethanol percentages between straight gasoline and E60, the PDI ratio model 318 provides for PFI and DI fractions between 70/30 and 0/100. For example, as shown in FIG. 5, ethanol percent is shown on the vertical axis 502 versus PFI fraction (percent of fuel supplied through the PFI injectors 151-158), on the horizontal axis 504. Curve 506 depicts, as a function of ethanol percentage in the fuel, the fraction of fuel supplied through the PFI Injectors 151-156. The remaining fraction of fuel out of one-hundred percent is supplied through the DI injectors 161-168. Curve 506 shows that at 60-100 percent ethanol, fuel is supplied only through the DI injectors 161-168. At no ethanol in the fuel, seventy-percent of the fuel is supplied through the PFI injectors 151-158. Between 0-60 percent, varying amounts of fuel are supplied through the PFI injectors 151-158 with more fuel supplied through the PFI injectors 151-158 as the percent of ethanol declines. Because zero-percent ethanol results in seventy-percent PFI injection, seventy-percent is the maximum amount of PFI injection that is achievable.

The controller apportions fuel between the PFI injectors 151-158 and the DI injectors 161-168 as a function of the percent of ethanol in the fuel and independent of a load on the engine 102/engine system 100. The method 400 may be scheduled to run continuously when the engine 102 operates and only end 412 when operation of the engine 102 ceases, may run intermittently on a timed basis and end 412 at the expiry of the timer, or may run based on a predetermined event, such as initially following a refueling event and then end 412 until the next refueling event. The method 400 results in effective particulate matter minimization with less complexity in engine control.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of operating an engine system with port fuel injection injectors and direct injection injectors, the method comprising:
   determining, by a controller, a percent of ethanol in a fuel of the engine system;
   determining, by the controller, whether the percent of ethanol is greater than a predetermined threshold; and
   operating, by the controller and when the percent of ethanol is greater than the predetermined threshold, the engine system supplying the fuel only through the direct injection injectors.

2. The method of claim 1, further comprising:
   operating, by the controller and when the percent of ethanol is not greater than the predetermined threshold, the engine system supplying the fuel through a combination of the direct injection injectors and the port fuel injection injectors.

3. The method of claim 2, further comprising determining, by the controller and based on the percent of ethanol, a ratio of the fuel supplied through the port fuel injectors to the fuel supplied through the direct injection injectors.

4. The method of claim 1, further comprising setting the predetermined threshold at a level of ethanol in the fuel where particulate emissions from the engine system are less than when the engine system is operated on gasoline without ethanol.

5. The method of claim 2, further comprising:
   defining, by an engine, a number of cylinders;
   supplying, via an intake system, air to the number of cylinders;
   injecting, through the direct injection injectors, a first fraction of the fuel directly into the number of cylinders; and
   injecting, through the port fuel injection injectors, a second fraction of the fuel into the intake system outside the number of cylinders.

6. The method of claim 1, further comprising:
   collecting, by an ethanol sensor, sensed fuel data;
   receiving, by the controller, the sensed fuel data; and
   determining, by the controller using the sensed fuel data, the percent of ethanol in the fuel.

7. The method of claim 1, further comprising controlling, by the controller, particulate matter discharge from the engine system by apportioning a first fraction of the fuel to the port fuel injection injectors and apportioning a second fraction of the fuel to the direct injection injectors, wherein the first fraction and the second fraction total all of the fuel supplied into an engine of the engine system.

8. The method of claim 1, further comprising setting, by the controller and when the percent of ethanol is not greater than the predetermined threshold, a supply of the fuel through the port fuel injection injectors to a maximum of seventy-percent of a total flow of fuel for combustion in the engine system.

9. The method of claim 1, further comprising, maintaining, by the controller and when the percent of ethanol is greater than the predetermined threshold, the port fuel injection injectors in a closed state.

10. The method of claim 1, operating, by the controller and when the percent of ethanol is not greater than the predetermined threshold, the engine system supplying the fuel through a combination of the direct injection injectors and the port fuel injection injectors as a function of the percent of ethanol and independent of a load on the engine system.

11. An engine system comprising:
    port fuel injection injectors;
    direct injection injectors; and
    a controller configured to:
        determine a percent of ethanol in a fuel of the engine system;
        determine whether the percent of ethanol is greater than a predetermined threshold; and
        operate, when the percent of ethanol is greater than the predetermined threshold, the engine system supplying the fuel only through the direct injection injectors.

12. The engine system of claim 11, wherein the controller is configured to operate, when the percent of ethanol is not greater than the predetermined threshold, the engine system supplying the fuel through a combination of the direct injection injectors and the port fuel injection injectors.

13. The engine system of claim 12, wherein the controller is configured to determine, based on the percent of ethanol, a ratio of the fuel supplied through the port fuel injectors to the fuel supplied through the direct injection injectors.

14. The engine system of claim 11, wherein the predetermined threshold is set at a level of ethanol in the fuel where particulate emissions from the engine system are less than when the engine system is operated on gasoline without ethanol.

15. The engine system of claim 12, further comprising:
    an engine defining a number of cylinders; and
    an intake system configured to supply air to the number of cylinders,
    wherein the controller is configured to inject, through the direct injection injectors, a first fraction of the fuel directly into the number of cylinders,
    wherein the controller is configured to inject, through the port fuel injection injectors, a second fraction of the fuel into the intake system outside the number of cylinders.

16. The engine system of claim 11, further comprising:
    an ethanol sensor configured to collect sensed fuel data,
    wherein the controller is configured to receive the sensed fuel data,
    wherein the controller is configured to determine, using the sensed fuel data, the percent of ethanol in the fuel.

17. The engine system of claim 11, comprising an engine, wherein the controller is configured to control particulate matter discharge from the engine system by apportioning a first fraction of the fuel to the port fuel injection injectors and apportioning a second fraction of the fuel to the direct injection injectors, wherein the first fraction and the second fraction total all of the fuel supplied into the engine.

18. The engine system of claim 11, wherein the controller is configured to set, when the percent of ethanol is not greater than the predetermined threshold, a supply of the fuel through the port fuel injection injectors to a maximum of seventy-percent of a total flow of fuel for combustion in the engine system.

19. The engine system of claim 11, wherein the controller is configured to:
- maintain, when the percent of ethanol is greater than the predetermined threshold, the port fuel injection injectors in a closed state, and
- operate, when the percent of ethanol is not greater than the predetermined threshold, the engine system supplying the fuel through a combination of the direct injection injectors and the port fuel injection injectors as a function of the percent of ethanol, and independent of a load on the engine system.

20. An engine system comprising:
- an engine defining a number of cylinders and configured to operate on a fuel;
- an intake system configured to supply air to the cylinders;
- a set of direct injection injectors configured to inject the fuel directly into the number of cylinders;
- a set of port fuel injection injectors configured to inject the fuel into the intake system outside the number of cylinders; and
- a controller configured to:
  - determine a percent of ethanol in a fuel of the engine system;
  - determine whether the percent of ethanol is greater than a predetermined threshold;
  - operate, when the percent of ethanol is greater than the predetermined threshold, the engine system supplying the fuel only through the direct injection injectors; and
  - operate, when the percent of ethanol is not greater than the predetermined threshold, the engine system supplying the fuel through a combination of the direct injection injectors and the port fuel injection injectors.

* * * * *